United States Patent [19]

Kobayashi et al.

[11] Patent Number: 5,412,543
[45] Date of Patent: May 2, 1995

[54] VARIABLE LIGHT DISTRIBUTION TYPE HEADLAMP

[75] Inventors: Shoji Kobayashi; Hirohiko Ohshio; Masaaki Ishikawa; Hideki Uchida, all of Shizuoka, Japan

[73] Assignee: Koito Manufacturing Co., Ltd., Tokyo, Japan

[21] Appl. No.: 22,536

[22] Filed: Feb. 25, 1993

[30] Foreign Application Priority Data

Feb. 28, 1992 [JP] Japan .............................. 4-018169 U
Jun. 29, 1992 [JP] Japan .............................. 4-192696
Feb. 22, 1993 [JP] Japan .............................. 5-056471

[51] Int. Cl.$^6$ ............................................. B60Q 1/06
[52] U.S. Cl. ....................................... 362/66; 362/284; 362/324
[58] Field of Search .................... 362/66, 67, 71, 282, 362/284, 287, 323, 324

[56] References Cited

U.S. PATENT DOCUMENTS 4,943,893 7/1990 Shibata et al. ...................... 362/37

OTHER PUBLICATIONS

English translation of German Office Action.

Primary Examiner—Stephen F. Husar
Attorney, Agent, or Firm—Sughrue, Mion, Zinn, Macpeak & Seas; Richard C. Turner; Joseph J. Buczynski

[57] ABSTRACT

In the rear of a collimator lens there is disposed a reflector having a bulb serving as a light source, and a shade is interposed between the collimator lens and bulb. The reflector is mounted by means of a guide engagement mechanism, which is arranged such that guide pins provided in the front edge portion of the reflector are pivotally and slidably engaged with a plurality of guide grooves formed in a guide plate fixed on the side of the collimator to thereby be able to deflect an optical axis. The guide engagement mechanism controls or displaces the reflector by use of a control motor. The shade is fixedly secured on the side of the collimator lens.

5 Claims, 10 Drawing Sheets

VARIABLE LIGHT DISTRIBUTION TYPE HEADLAMP

BACKGROUND OF THE INVENTION

The present invention relates to a reflector drive mechanism applicable to a headlamp system of so called a variable light distribution type headlamp which, when an automobile is running in a winding road, deflects the illuminating light of the headlamp to a side toward which the automobile is going to turn.

Figure 1:
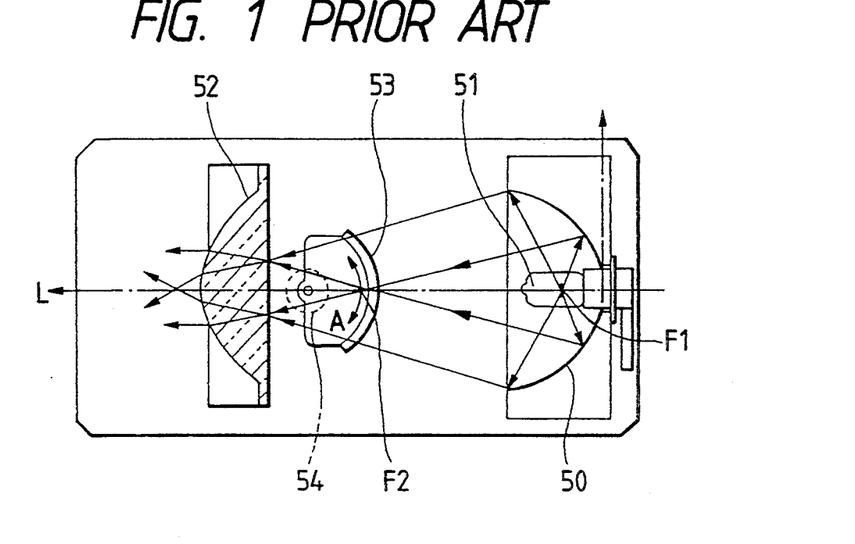
FIG. 1 is a plan view of main portions of a conventional projection lamp.

There has been demand for a headlamp for use in an automobile which, when the automobile is running on a winding road, is capable of deflecting the illuminating light of the headlamp to a side toward which it is going to turn in accordance with the angle of rotation of a steering wheel to thereby secure a good visibility in a road ahead. Thus, conventionally, there has been used a variable light distribution type headlamp using a projection lamp, as shown in FIG. 1.

In other words, in the above-mentioned conventional variable light distribution type headlamp, a bulb 51 serving as a light source is disposed at a first focal point F1 of a reflector 50 consisting of an ellipsoidal reflecting mirror surface and having an optical axis L, a collimator lens 52 having the optical axis L in common with the reflector 50 is fixedly disposed in front of the optical axis L of the reflector 50 with the focal point of the lens 52 substantially identical with a second focal point F2, and a shade 53 pivotally disposed at the position of the second focal point F2 and extending across the optical axis L can be driven or displaced by an actuator such as a motor 54 or the like, that is, the shade 53 can be turned (in a direction of an arrow A shown in FIG. 1) by means of the motor 54 so that the shade 53 corresponds to the angle of rotation of a steering wheel of an automobile. That is, by changing the cut-off position of the illuminating light by the shade 53, the light distribution pattern of the illuminating light is controlled so as to match the running direction of the automobile.

However, in the conventional variable light distribution type headlamp, due to the fact that the illuminating light of the headlamp is previously diffused so as to correspond to the angles of the headlamp when the headlamp is swung right and left and the illuminating light is cut off by the shade 53 to thereby obtain a necessary light pattern, the amount of the light to be cut off is large and the thermal efficiency is poor so that the amount of light of the bulb 51 serving as the light source must be large. As a result of this, not only there arise economical disadvantages due to the poor thermal efficiency and due to use of the large bulb 51, but also there is required a countermeasure on the heat storage of the headlamp.

Also, in the above-mentioned conventional structure, in addition to the problem of heat storage in the headlamp, since a drive mechanism serving as a drive mechanism portion of the shade 53 must be disposed within the headlamp, there arises a further problem in heat. Further, in the conventional structure, since the light is cut off by the shade 53 to thereby form an illuminating pattern, only the two-dimension change on the optical axis L of the shade 53 can be reflected on the pattern change, with the result that the light swung right or left provides a dazzling light against an oncoming automobile.

In addition, in the above-mentioned variable light distribution type headlamp, the illumination distribution of the illuminating light depends on the projection of the illumination distribution on the focal plane of the collimator lens, with the result that the illumination distribution of the illuminating light is influenced by the distribution condition of the light on the focal plane to be collected by the reflector. Therefore, in the structure of the above-mentioned variable light distribution type headlamp, when the optical arrangement of the collimator lens and shade is fixed, the shape of the cut-off line in the pattern of the illuminating light can be maintained however, if the optical arrangement of the reflector with respect to the shade is changed, then the illumination distribution of the cut-off line is caused to vary. In other words, if the reflector is displaced along the optical axis thereof, then the light collecting condition of the illuminating light is caused to vary. Also, if the reflector is displaced in a direction perpendicular to the optical axis, then the illumination pattern is changed in the opposite direction.

SUMMARY OF THE INVENTION

The present invention aims at eliminating the above-mentioned problem found in the conventional headlamp. Accordingly, it is an object of the invention to provide a novel reflector drive mechanism for a projection lamp capable of illuminating ahead on a winding road in accordance with the angle of rotation of a steering wheel of an automobile and the like to thereby secure an excellent visibility and also can provide an excellent thermal efficiency and a favorable light distribution pattern.

It is another object of the invention to provide a variable light distribution type of headlamp capable of forming the illuminating light pattern by means of a clear cut-off line and also can obtain a light distribution pattern suitable for the running environment of a vehicle.

To achieve the above objects, according to the invention, there is provided a reflector drive mechanism for use in a projection lamp including a reflector having a bulb serving as a light source disposed in the rear of a collimator lens and a shade interposed between the collimator lens and bulb for cutting off a part of light, in which the reflector is pivotally mounted by means of optical axis deflecting and pivotally supporting means which pivotally mount the reflector to the collimator lens in such a manner that the optical axis of the reflector can be deflected, the reflector is arranged such that it is controlled or deflected by a controllable actuator, and the shade is fixedly disposed on the side of the collimator.

Further, the optical axis deflecting and pivotally supporting means can be realized by connecting the reflector to the collimator lens by means of a guide engagement mechanism in which a plurality of guide pins provided on the reflector side are slidably engaged with a plurality of guide grooves respectively formed in a guide plate fixed on the collimator lens.

According to the above-mentioned structure, the reflector of the projection lamp is connected with the collimator lens by means of the guide engagement mechanism in such a manner that the reflector is slidable limitedly along the guide grooves, and the reflector is driven or slid by the controllable actuator such as a control motor or the like to thereby change the angle of incidence of light entering the collimator lens. Therefore, the light reflected from the reflector and entering the collimator is inclined right and left as well as upwardly and downwardly along the guide grooves of the guide engagement mechanism and thus the illuminating pattern of the light transmitted through the collimator lens is controlled or deflected right and left as well as upwardly and downwardly. That is, by controlling the actuator according to the angle of rotation of a steering wheel of an automobile, the illuminating light of the headlamp can be controlled or deflected along a winding road.

DESCRIPTION OF THE PREFERRED EMBODIMENTS

Detailed description of the preferred embodiments will now be hereinbelow given of the principles of a light distribution type headlamp according to the invention with reference to the accompanying drawings.

Figure 2:
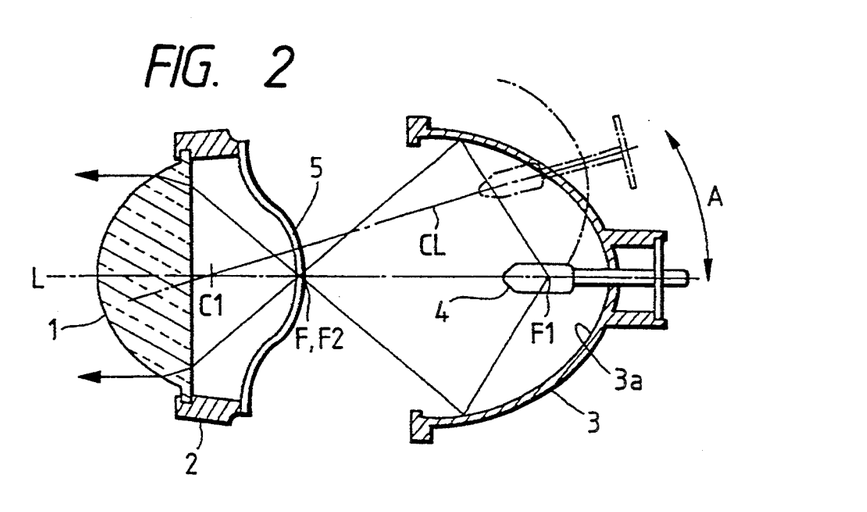
FIG. 2 is an explanatory view of a swing type of headlamp which illustrates the principles of a light distribution type of headlamp according to the invention.

At first, FIG. 2 shows a structure of a swing type of headlamp which is linked with a steering wheel of an automobile. In FIG. 2, reference numeral 1 designates a collimator lens fixedly secured to a headlamp body 2 and having a focal point F and a principal point C1, and L stands for an optical axis. In the rear of the collimator lens 1, there is pivotally disposed a reflector 3 having ellipsoidal reflecting mirror surface 3a in such a manner that it is free to swing right and left with respect to the optical axis L about the neighborhood of the principal point C1, a bulb 4 for lighting is fixedly disposed at the position of a first focal point F1 of the ellipsoidal reflecting mirror surface 3a, and at a position where the central axis CL of the reflector 3 overlaps with the optical axis L, a second focal point F2 shares the position in common with the focal point F of the collimator lens 1.

Preferably, from the view point of light distribution, the center of rotation or swing of the reflector 3 may be at least between the principal point C1 of the collimator lens 1 and the focal plane of a shade 5 which will be discussed later.

A reference numeral 5 designates a shade which is fixed to the lamp body 2 and extends along a focal plane defined by the second focal point F2 of the reflector 3 (because the second focal point F2 is displaced due to the displacement of the reflector 3, there is formed a curved surface with the principal point C1 as the center thereof). The shade 5 is arranged to cut off a part of light and form a given cut-off line with respect to the optical axis L.

Figure 3A:
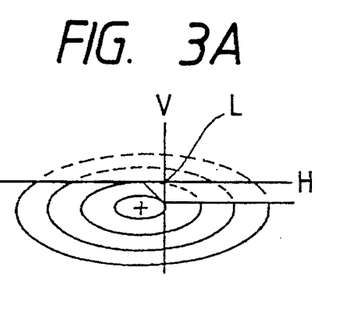
FIG. 3A is an explanatory view of the light distribution pattern of illuminating light when an automobile runs straight.
Figure 3B:
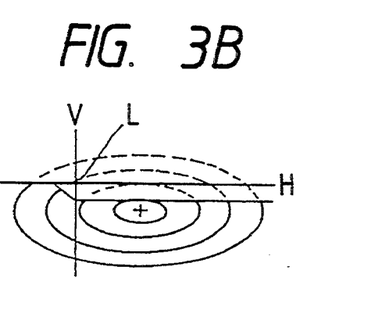
FIG. 3B is an explanatory view of the light distribution pattern of illuminating light when the automobile turns right.

If the reflector 3 having the above-mentioned structure is displaced or swung by a reflector displacement drive device (which will be discussed later) about the neighborhood of the principal point C1 in a right and left direction (a direction of an arrow A) with respect to the optical axis L, for example, so as to correspond to the swing direction of the automobile, then the center of illuminating light can be displaced right and left with respect to the optical axis L, as shown by illuminating patterns in FIGS. 3A and 3B. In this case, since the shade 5 is disposed in the focal plane of the reflector 3, the shade 5 is not displaced with respect to the optical axis L. Also, since the relative optical position of the shade 5 with respect to the reflector 3 is not changed, the illuminating patterns will never be enlarged nor reduced. This means that the displacement of the reflector 3 will not change the light density of the illuminating light but the illuminance thereof can be maintained constant.

Figure 4:
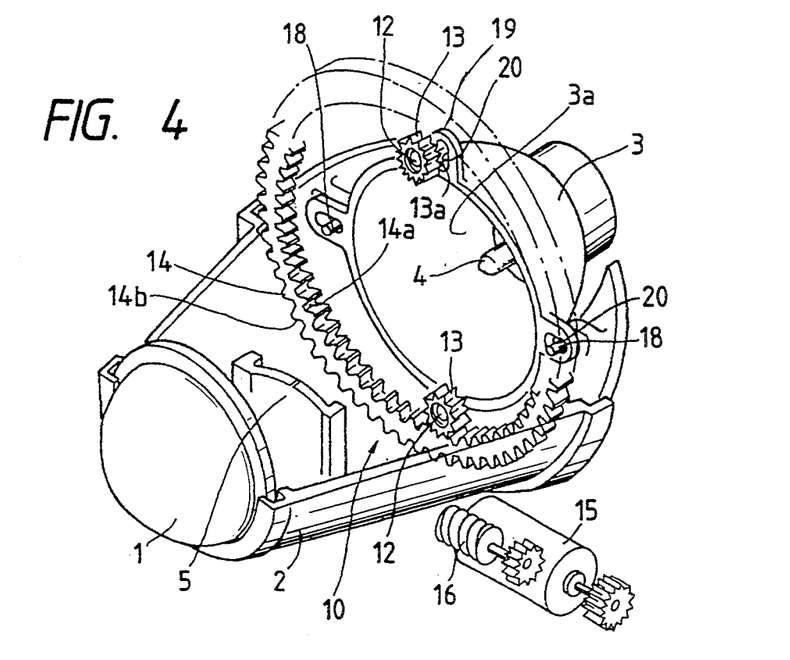
FIG. 4 is a partially cutaway perspective view of a first embodiment of a reflector displacement drive device different in sliding directions according to the invention.

Also, according to the above-mentioned structure, as shown in FIG. 4, there can be constructed a reflector displacement drive device 10 in which the positions of pin shafts 12, 12 respectively including gears 13, 13 thereon are set at the positions of twelve o'clock and six o'clock and eccentric pins 13a, 13a are respectively engaged with sliding hole grooves 20, 20 formed in support projections 19, 19 respectively provided at these positions (eccentric pin 13a, hole groove 20 and support projection 19 are not shown at the six o'clock position), while the positions of guide pins 18, 18 are respectively set at the positions of three o'clock and nine o'clock to thereby be able to displace the central axis CL of the reflector 3 right and left with respect to the optical axis L. Also, the inner gear 14a of gearing 14 is meshed with the two gears 13, 13 and the outer gear 14b of the gearing 14 is meshed with a worm gear 16 mounted to the output shaft of a drive motor 15.

Figure 5:
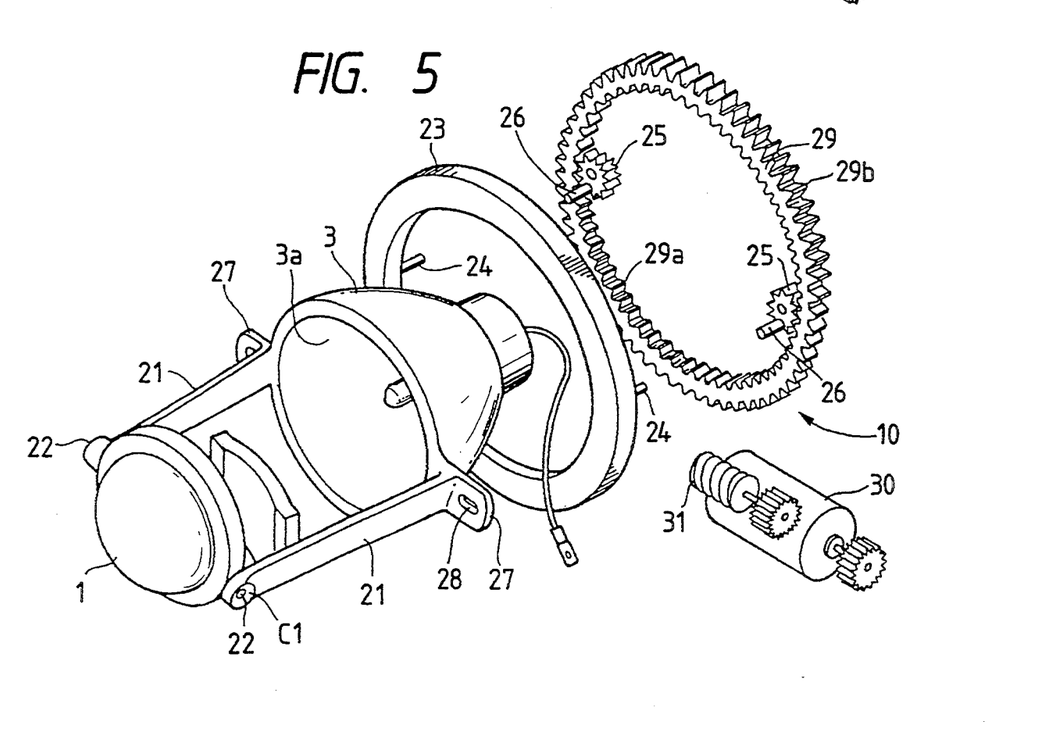
FIG. 5 is an exploded perspective view of a second embodiment of a reflector displacement drive using a different displacing method.
Figure 6:
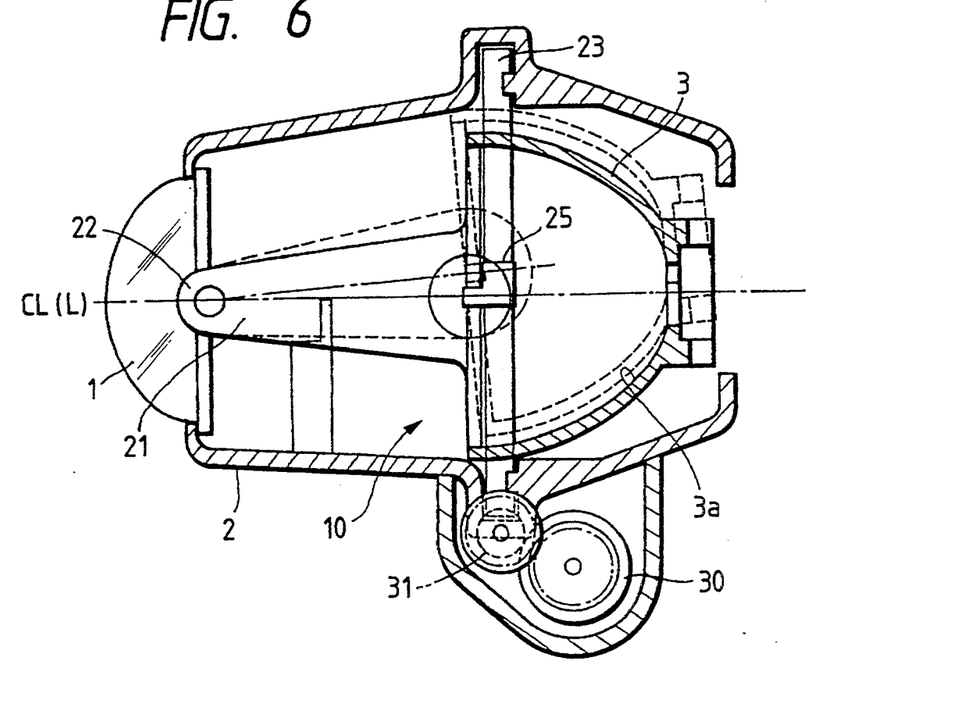
FIG. 6 is a longitudinal section view of the reflector displacement drive device.
Figure 7:
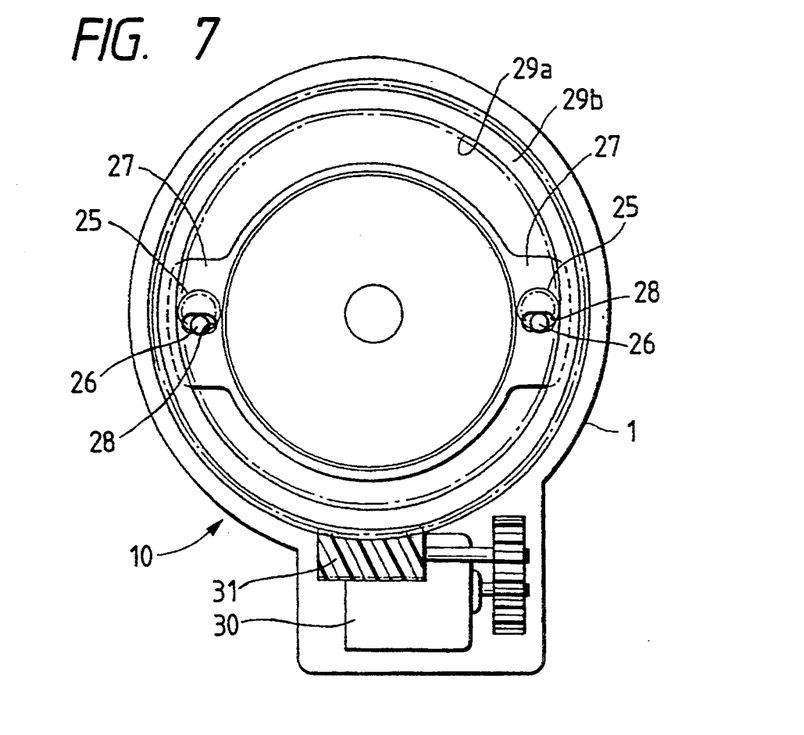
FIG. 7 is a front view of main portions of the reflector displacement drive device.

Now, in FIGS. 5 to 7, there is shown a second embodiment of a reflector displacement drive device 10 which is arranged so as to displace the angle of the central axis CL of the reflector 3 in an elevation direction with the neighborhood of the principal point C1 of the collimator lens 1 as the swing center thereof.

In these figures, reference characters 21, 21 stand for support arms which are projected forwardly from the three o'clock and nine o'clock positions of the reflector 3 respectively. The support arms 21, 21 respectively include end portions which in turn have vertical swing surfaces, respectively. The ends portions of the support arms 21, 21 are pivotally mounted to the positions of the lamp body 2 corresponding to the principal point C1 of the collimator lens 1 through pin shafts 22, 22 respectively provided at such positions of the lamp support body 2 in such a manner that the support arms 21, 21 can be freely swung about the same end portions through the vertical swing surfaces thereof.

The lamp body 2 includes a ring-shaped support frame 23 which is fixed to the middle portion of the lamp body 2. The support frame includes pin shafts 24, 24 respectively provided at the three o'clock and nine o'clock positions thereof, gears 25, 25 respectively disposed on the pin shafts 24, 24, and eccentric pins 26, 26 respectively provided at the eccentric positions of the gears 25, 25. The eccentric pins 26, 26 are slidably inserted into slide hole groove 28, 28 respectively formed horizontally in support projections 27, 27 which respectively project from the three o'clock and nine o'clock positions of the reflector 3. Also, the inner gear 29a of a gearing 29 is meshed with the two gears 25, 25 and the outer gear 29b of the gearing 29 is meshed with a worm gear 31 mounted to the output shaft of a drive motor 30 which is fixed to the lamp body 2.

In the light distribution type headlamp constructed in the above-mentioned manner, the drive motor 30 is driven or rotated right or left to thereby change the central shaft CL of the reflector 3 in a vertical direction with respect to the optical axis L with the principal point C1 of the collimator lens 1 as the center of rotation thereof. Further, if the gearing 29 with its outer gear 29b in mesh with the worm gear 31 is rotated with the rotational movement of the drive motor 30, then the gears 25, 25 in mesh with the inner gear 29a of the gearing 29 are rotated. Accordingly, the eccentric pins 26, 26 respectively provided at the eccentric positions of the gears 25, 25 respectively slide within the slide hole grooves 28, 28 formed in the support projections 27, 27 respectively projected from the three o'clock and nine o'clock positions of the reflector 3 so as to displace the support projections 27, 27 in a vertical direction, so that the support arms 21, 21 are displaced or rotated with the pin shafts 22, 22 as the center of rotation thereof. As a result of this, the central shaft CL of the reflector 3 is operated such that it is displaced angularly with respect to the optical axis L of the collimator lens 1.

The reflector displacement drive 10 is a device which is used to incline or move parallely the central shaft CL of the reflector 3 with respect to the optical axis L of the collimator lens 1. Accordingly, the structure of the reflector displacement drive 10 is not limited to the above-illustrated one, however, of course other various changes and modifications are also possible.

Now, description will be given below of a third embodiment of a reflector drive mechanism of a projection lamp according to the invention with reference to FIGS. 8 to 12.

In FIGS. 8 to 12, reference character 101 designates a collimator lens fixedly secured to a lens mount 103 which is in turn fixed to a housing 102, and the collimator lens 101 forms a convex lens which has a focal point F on an optical axis L1. Also, 104 stands for a reflector pivotally mounted through a guide engagement mechanism 105 to a guide plate 110 fixed to the housing 102 in such a manner that the reflector 104 can be freely displaced in the directions of arrows B and C. The reflector 104 includes an ellipsoidal reflecting mirror surface 106 having an optical axis L2, and a bulb 107 serving as a light source is mounted into a bulb socket 108 which is in turn fixed to the bottom portion of the ellipsoidal reflecting mirror surface 106 so that the bulb 107 is substantially situated at the first focal point F1 on the optical axis L2. The reflector 104 is pivotally mounted by means of the guide engagement mechanism 105 in such a manner that the second focal point F2 on the optical axis L2 is displaced (in the direction of the arrow B) substantially identically with the focal point F position of the collimator lens 101.

Figure 8:
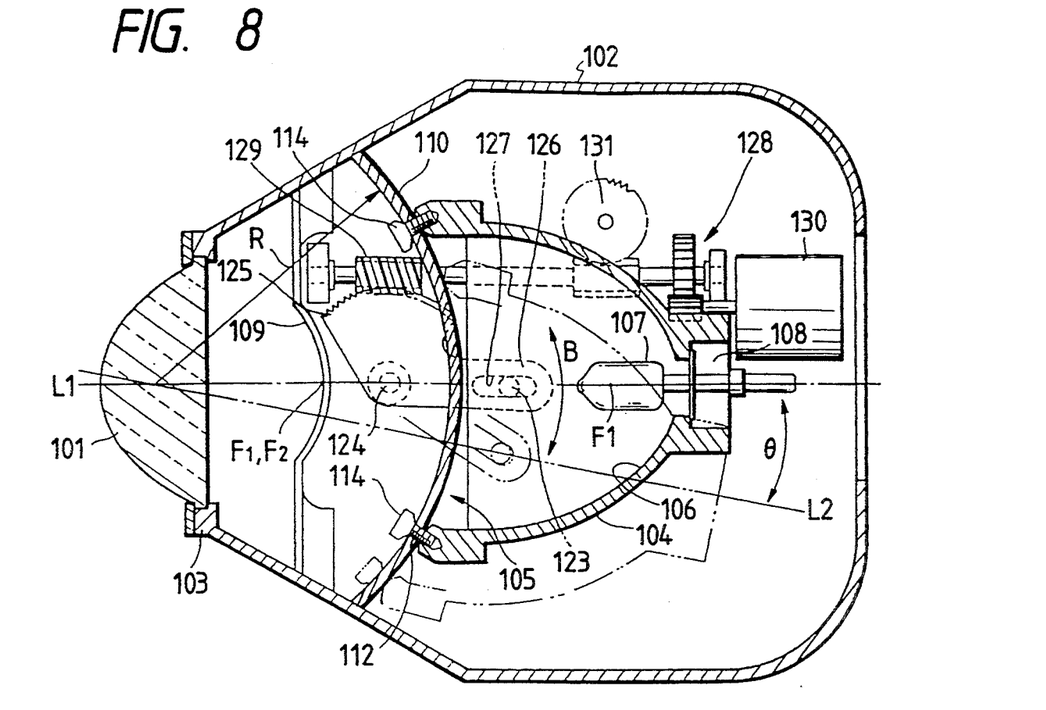
FIG. 8 is a plan section view of main portions of a third embodiment of a reflector drive mechanism of a projection lamp according to the invention.
Figure 9:
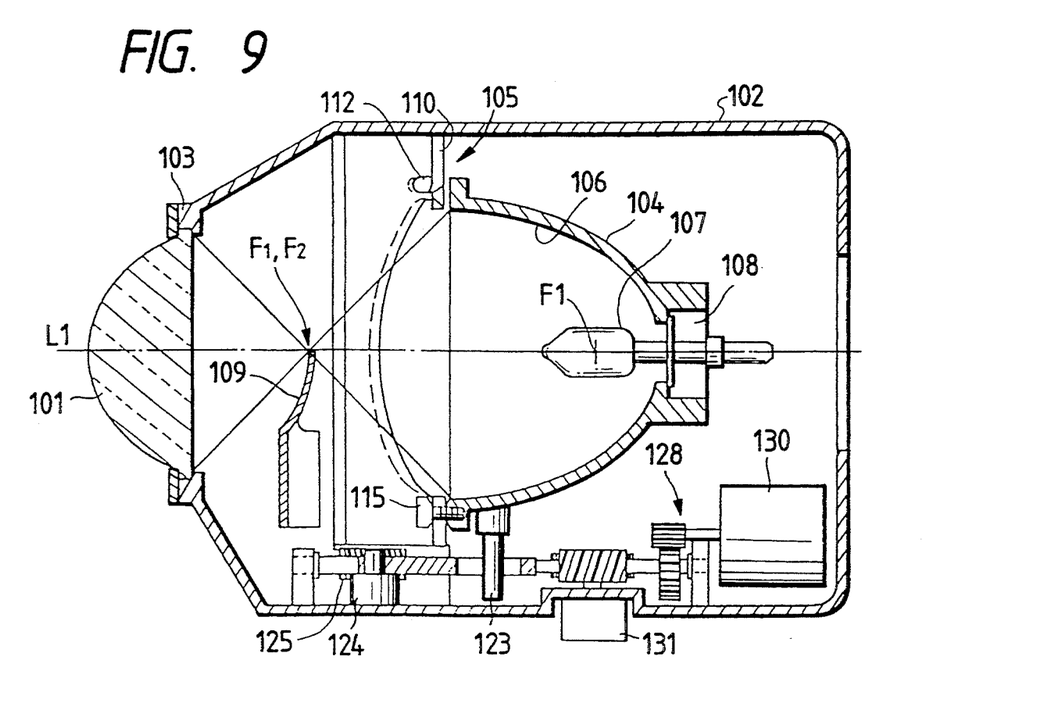
FIG. 9 is a longitudinal section view of the headlamp.
Figure 10:
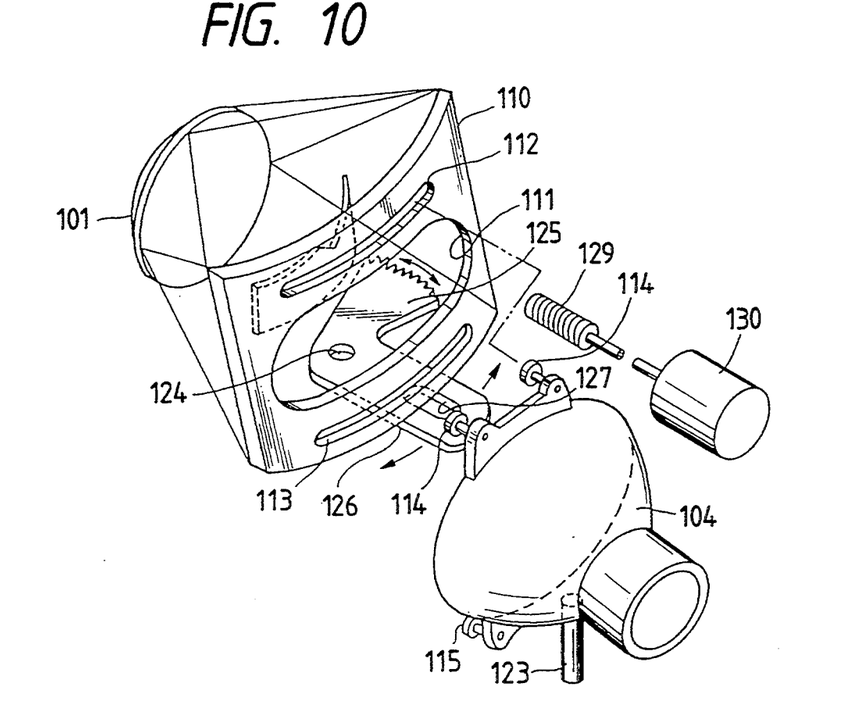
FIG. 10 is an exploded perspective view of the headlamp.

A reference numeral 109 stands for a shade which is fixed to the housing 102 in such a manner that it is situated at the focal point F (the second focal point F2 of the reflector 104) of the collimator lens 101. The shade 109 is arranged such that it forms a cut-off line to cut off the light existing substantially below the optical axis L1 and L2.

Figure 11:
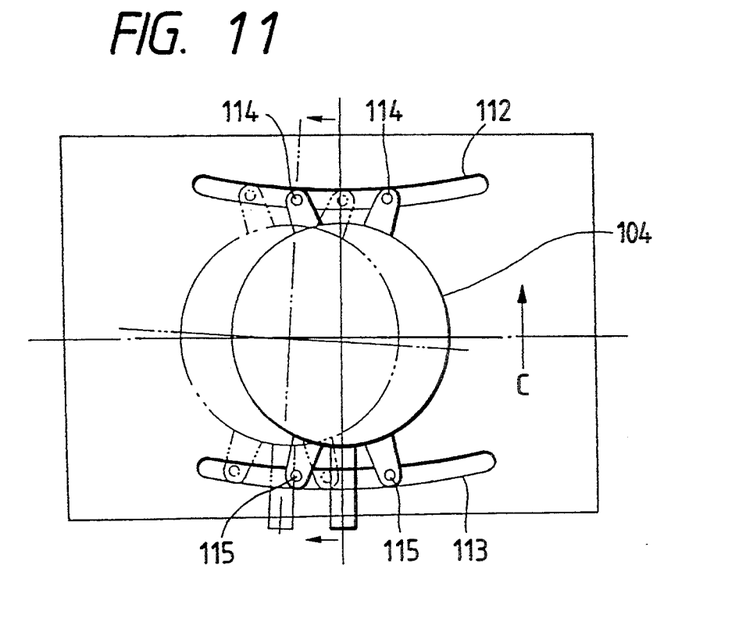
FIG. 11 is an explanatory view of the operation of a guide engagement mechanism for use in the headlamp.

The guide engagement mechanism 105 includes two guide grooves 112, 113 respectively disposed above and below a through hole 111 formed in a guide plate 110 which is fixed to the housing 102 and has a cylindrically curved surface with a curvature R in a plane direction. The guide engagement mechanism 105 also includes optical axis deflecting and pivotally supporting means which is arranged such that guide pins 114, 114 provided in the upper portion of the front edge of the reflector 104 are pivotally engaged with the guide groove 112 so as to be freely slidable along the guide groove 112 while guide pins 115, 115 provided in the lower portion of the front edge of the reflector are pivotally engaged with the guide groove 113 so as to be freely slidable along the guide groove 113. The guide engagement mechanism 105 is arranged such that it is displaced as shown by a two-dot chained line in FIG. 8.

A reference numeral 123 designates a guide pin which is provided in the lower end of the front end portion of the reflector 104. The guide pin 123 is arranged such that it can be inserted through a guide groove 127 formed in a swing rod 124 projected from a fan-shaped worm wheel 125 which is rotatably mounted to the bottom wall of the housing 102 through a pivotal shaft 124. Also, the guide pin 123 is used to mesh the worm wheel 125 with a worm drive gear 129 mounted to a rotation transmission mechanism 128 pivotally provided in the housing 102, and to swing rod 124 by driving or rotating right or left a control motor 130 which is rotationally connected to the end portion of the rotation transmission mechanism 128 to thereby swing the reflector 104 in the direction of an arrow B through the guide pin 123.

Further, a reference numeral 131 designates a potentiometer which outputs the angle of rotation of the control motor 130. An angle detect value from the potentiometer 131 is feedback input to a control mechanism (not shown) to thereby obtain the angle of control rotation of the control motor 130 which is used to obtain the angle of displacement $\theta$ of the reflector 104 corresponding to the angle of rotation of a steering wheel of an automobile.

Figure 12A:
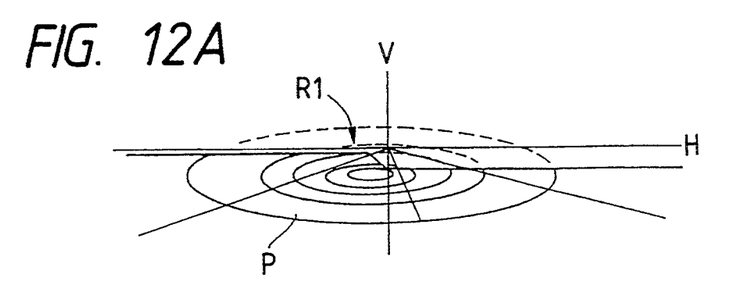
FIGS. 12A, 12B and 12C are respectively explanatory views of illuminating patterns provided by the headlamp.
Figure 12B:
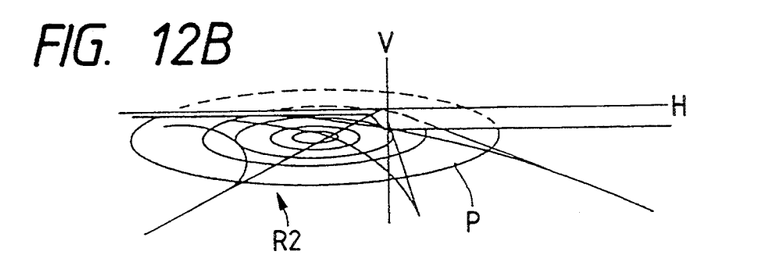
Figure 12C:
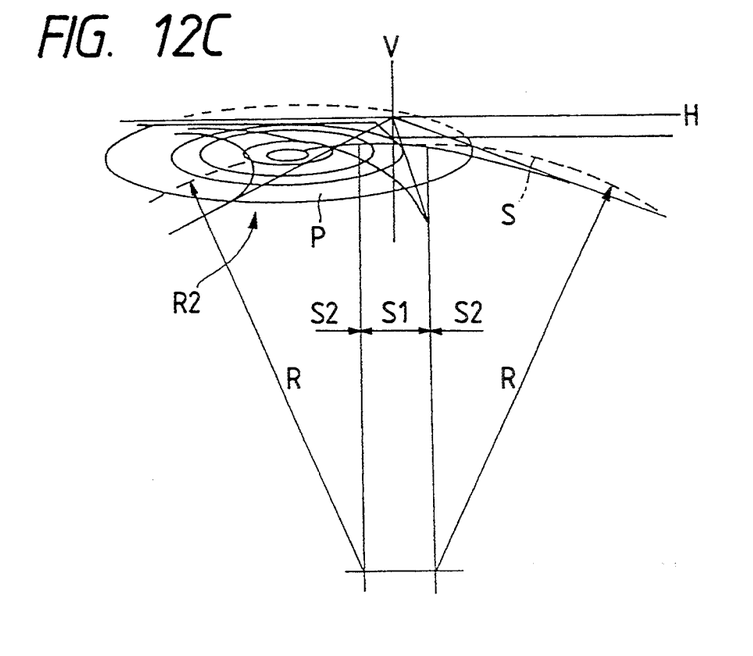

The reflector drive mechanism of a projection lamp constructed in the above-mentioned manner is arranged such that the second focal point F2 of the reflector 104 is substantially identical with the focal point F of the collimator lens 101 and the shade 109 is fixedly disposed at the position of the focal points F, F2. Therefore, if the bulb 107 is turned on, as shown in FIG. 12A, the light that has passed through the collimator lens 101 then becomes substantially a parallel light and illuminates a forward path R1 (or a path ahead). If the steering wheel of the automobile is swung along a winding road R2 (in FIG. 12B, a right swing is shown), then the control motor 130 is rotated through the control mechanism to thereby rotate the fan-shaped worm wheel 125. This displaces the reflector 104 in the direction of the arrow B through the guide pin 123 engaged with the guide groove 127 in the swing rod 126 while it is supported by the guide engagement mechanism 105, thereby inclining the optical axis L2 of the reflector 104 with respect to the optical axis L1 of the collimator lens 101. Therefore, in a central range S1 of the guide grooves 112,113, as shown in FIG. 12B, the light distribution pattern of the illuminating light is deflected only in a horizontal direction and, in two side ranges S2, as shown in FIG. 12C, the light distribution pattern P of the illuminating light is deflected in such a manner that it goes downwardly while drawing an arc-shaped locus as it is deflected horizontally and laterally, which can solve a problem of a dazzling light against an oncoming automobile.

Figure 13:
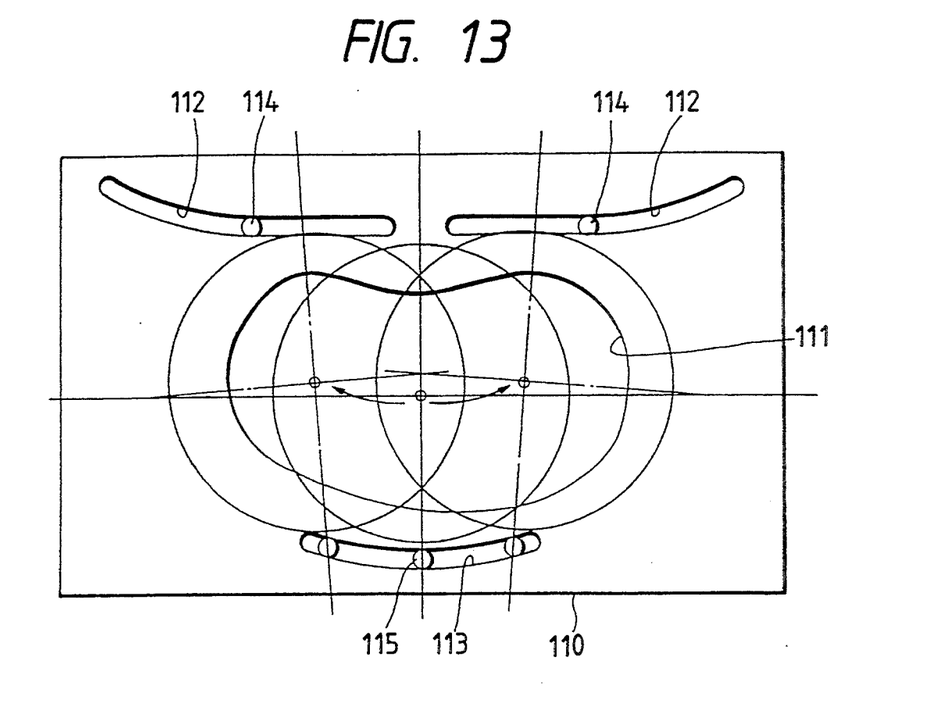
FIG. 13 is a front view of a guide plate for use in a guide engagement mechanism which shows another embodiment of the reflector drive mechanism of a projection lamp according to the invention.
Figure 14:
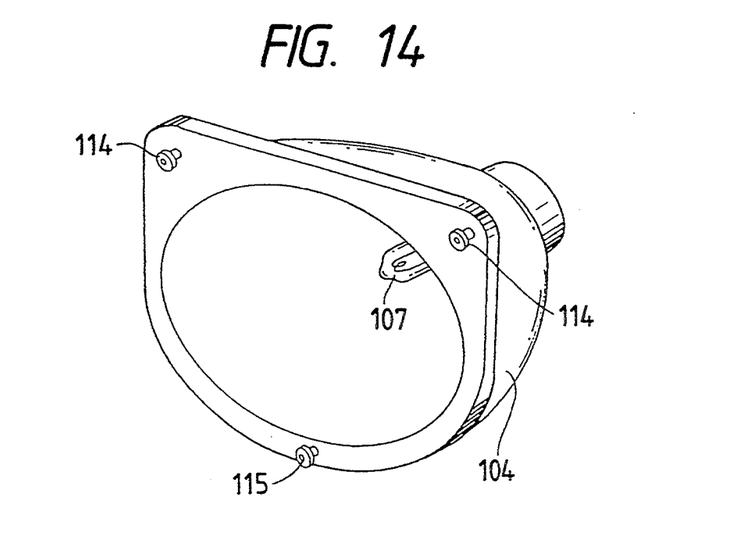
FIG. 14 is a perspective view of a structure of a front edge portion of a reflector of the headlamp.

Next, FIGS. 13 and 14 illustrate another embodiment of the guide engagement 105. Description will be given below of only the portions thereof the are different from the above-mentioned second embodiment.

In this embodiment, optical axis deflecting and pivotally supporting means is structured as follows. That is, two guide grooves 112, 112 are formed above a through hole 111 formed in a guide plate 110 and a guide groove 113 is formed below the through hole 111; and, two pins 114, 114, which are respectively provided in the upper portion of the front edge portion of a reflector 104, are pivotally engaged with the upper guide grooves 112, 112 in such a manner that they freely slidable along the upper guide grooves 112,112, while a guide pin 115 provided in the lower portion of the front edge portion of the reflector 104 is pivotally engaged with the lower guide groove 113 in such a manner that it is freely slidable along the lower guide groove 113.

Therefore, according to the optical axis deflecting and pivotally supporting means, if the reflector 104 is displaced in a right and left direction, then there is produced a difference in height between the upper pivotal support structures, whereby the reflector 104 is rotated with the lower pivotal support structure as a longitudinal pivot and with the optical axis L2 as an axis of rotation.

Figure 15:
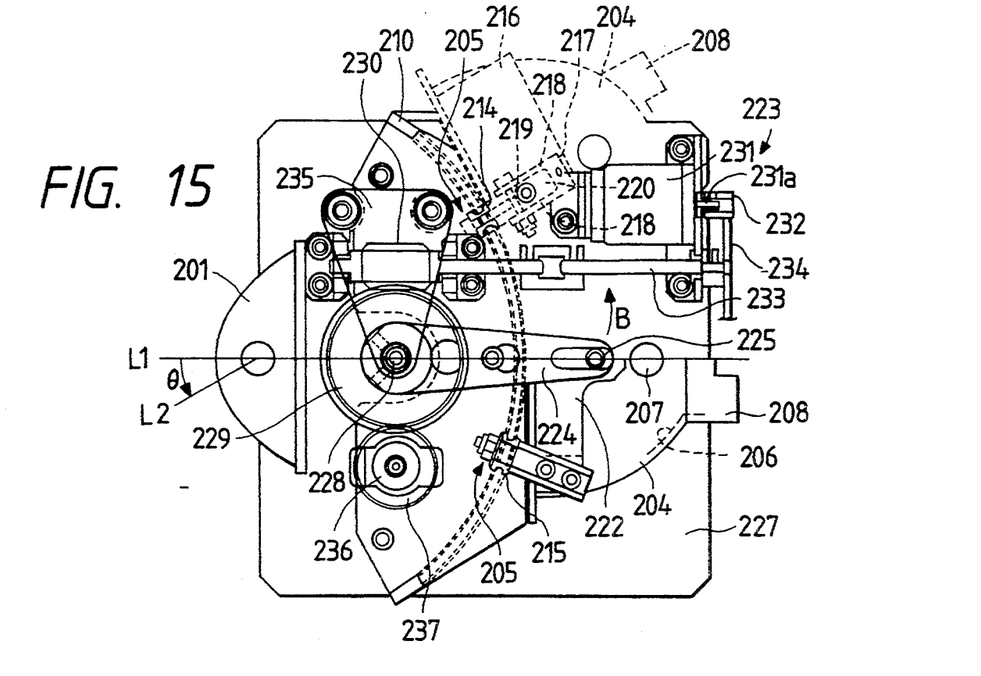
FIG. 15 is a plan section view of main portions of a fourth embodiment of a reflector drive mechanism of a projection lamp according to the invention.

Now, description will be given below of a fourth embodiment of a reflector drive mechanism of a projection lamp according to the invention with reference to FIGS. 15 to 19. The dotted lines shown in FIG. 15, shows a reflector (described later) which is displaced in parallel direction by a rotational force transmitting mechanism.

Figure 17:
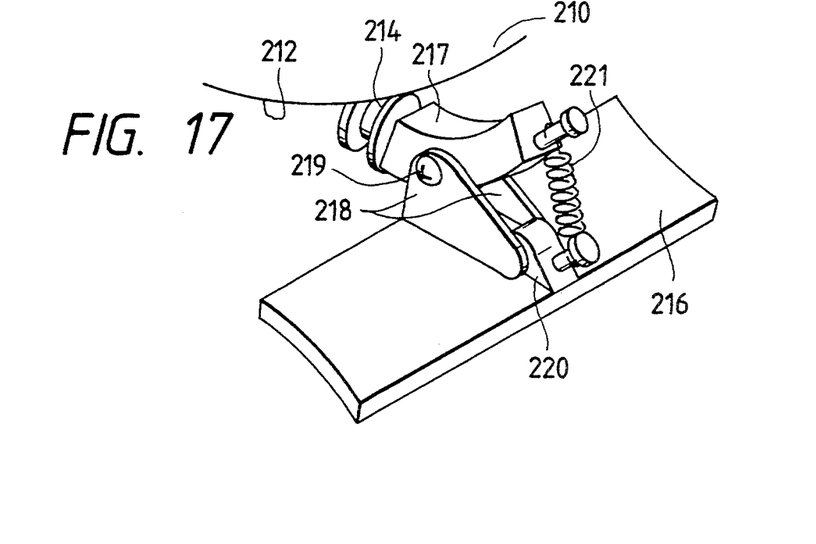
FIG. 17 is an enlarged perspective view showing an essential part of an upper guide roller of the fourth embodiment shown in FIG. 15.
Figure 18:
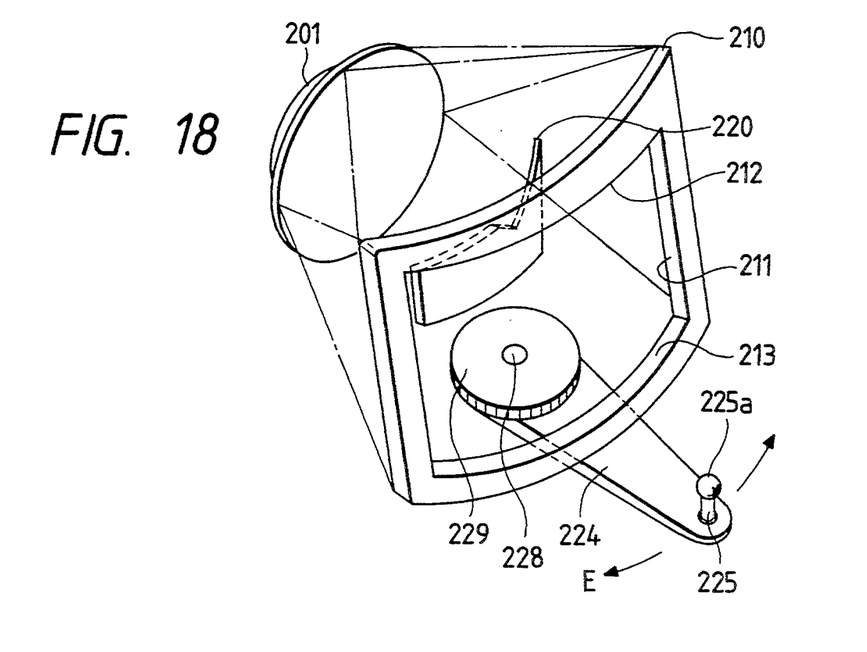
FIG. 18 is an essential perspective view showing a positional relationship between a guide plate and a pivot arm.
Figure 19:
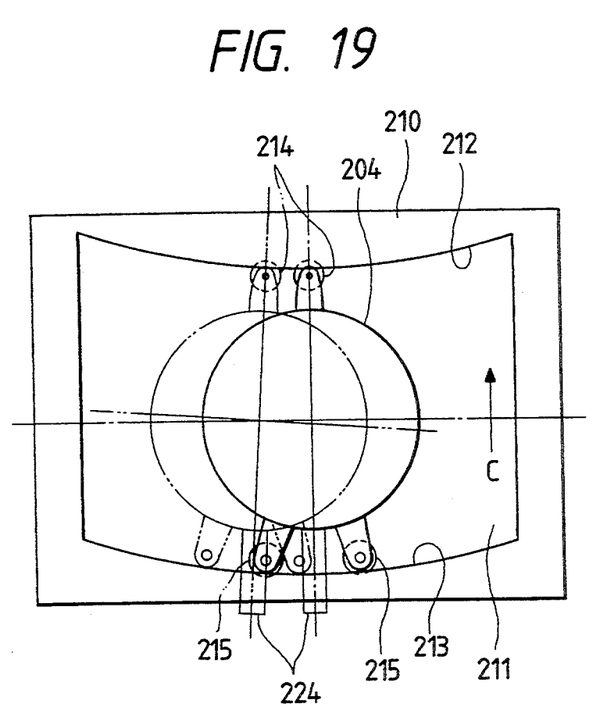
FIG. 19 is an explanatory view of the operation of a guide engagement mechanism for use in the headlamp.

In FIGS. 15 to 19, reference character 201 designates a collimator lens fixedly secured to a front end of a lens mount 203, and the collimator lens 201 forms a convex lens which has a focal point F on an optical axis L1. Also, 204 stands for a reflector pivotally mounted through a guide engagement mechanism 205 to a guide plate 210, acting also as a reflector mounting plate, unitarily formed with a rear part of the lens mount 203 in such a manner that the reflector 204 can be freely displaced in the directions of arrows B (FIG. 15) and C (FIG. 19). The reflector 204 includes an ellipsoidal reflecting mirror surface 206 having an optical axis L2, and a bulb 207 serving as a light source is mounted to a bulb socket 208 which is in turn fixed to the bottom portion of the ellipsoidal reflecting mirror surface 206 so that the bulb 207 is substantially situated at the first focal point F1 on the optical axis L2. The reflector 204 is pivotally mounted by means of the guide engagement mechanism 205 in such a manner that the second focal point F2 on the optical axis L2 is displaced (in the direction of the arrow B) substantially identically with the focal point F position of the collimator lens 201.

Figure 16:
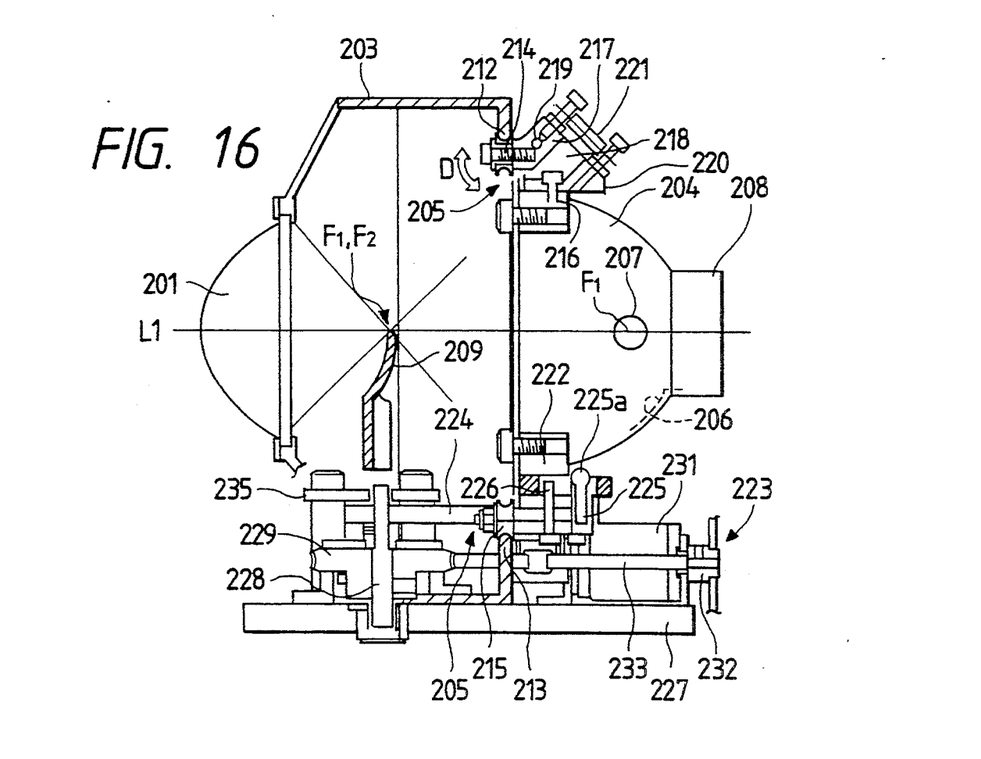
FIG. 16 is a longitudinal section view of the headlamp.

Also, 209 stands for a shade which is fixed to an inner wall of the lens mount 203 in such a manner that it is situated at the focal point F (the second focal point F2 of the reflector 204) of the collimator lens 201. The shade 209 is arranged such that it forms a cut-off line to cut off the light existing substantially below the optical axis L1 and L2.

The guide engagement mechanism 205 includes two guide edges 212, 213 respectively disposed above and below a through hole 211 for passing therethrough lights reflected from the reflector 204, which hole being formed in a guide plate 210 which is fixed to the rear edge of the lens mount 203 and has a cylindrically curved surface with a curvature R in a plane direction. The guide engagement mechanism 205 also includes optical axis deflecting and pivotally supporting means which is arranged such that an upper guide roller 214 protruding upward from a front edge of the reflector 204 is engaged with an upper guide edge 212 whereas a pair of lower guide rollers 215, 215 protruding downward from the front edge of the reflector 204 are engaged with a lower guide edge 213, so that the upper and lower guide rollers 214 and 215 are slidable along the longitudinal direction of the upper and lower guide edges 212 and 213, respectively. Thus, the reflector 204 is mounted on the guide plate 210 through the three guide rollers 214 and 215 formed at the front edge of the reflector and displaces along a rear surface of the guide plate 210 in the direction of arrow B in FIG. 15.

According the fourth embodiment, the upper guide roller 214 is secured to the upper reflector mount 216 fixed to the upper outside of the front edge of the reflector 204 and arranged rotatable with respect thereto. A roller body 217 axially mounting the upper guide roller 214 is engaged with a rotational shaft 219 to be pivotable in a vertical direction thereof. The rotational shaft 219 bridges laterally between side walls 218,218 projecting upward from the upper reflector mount 216. A base 220 is disposed under the roller body 217 while an extension spring 221 is connected between a rear end of the roller body 217 and a rear end of the base 220 so that the rear end side of roller body 217 is always urged downward whereas the front end side of the roller body 217 is urged always upward (along an arrow D) with the rotational shaft 219 acting as a fulcrum. Accordingly, the upper guide roller 214 is always urged against the upper guide edge 212 to thereby support the reflector 204 pivotably with respect to the guide plate 210.

The pair of lower guide rollers 215,215 are secured to the left and right sides of the lower reflector mount 222 fixed to an lower outer periphery of the front end of the reflector 204. The load of the reflector 204 is supported by the lower guide edge 213 of the guide plate 210 through the pair of lower guide rollers 215. The lower reflector mount 222 is provided with an elongated guide groove 226 arranged along the optical axis L1, which groove engages with a head 225a of a guide pin 225 protruding upward from a tip end of the pivot arm 224 constituting a rotational force transmitting mechanism 223 described later. The guide groove 226 is disposed at substantially center of the reflector mount 222.

The pivot arm 224 is secured to a shaft 228 engaged rotatably with an upper surface of a lamp base 227, and the head 225a of the guide pin 225 protruding from the tip end of the pivot arm 224 engages with the elongated guide groove 226 formed at a lower surface of the lower reflector mount 222 so that the head 225a is slidable with respect to the guide groove 226 along the axial direction thereof. A worm wheel 229 secured on the shaft 228 coaxially with the pivot arm 224 engages with a worm drive gear 230 of the rotational force transmitting mechanism 223 constructed on the lamp base 227 so that the pivot arm 224 is driven by a control motor 231 connected to an end part of the rotational force transmitting mechanism 223 to thereby swivel left and right directions (arrow E), and the reflector 204 pivots along an arrow B through the guide pin 225.

According to this embodiment, a drive source gear 232 secured to a drive shaft 231a of the control motor 231 engages with a driven gear 234 fixed to a rear end of the connecting arm 233, and the worm drive gear 230 is secured onto a front end of the connecting arm 233. The worm drive gear 230 engages with the worm wheel 229 and, hence, the rotational force transmitting mechanism is constructed. The rotational force transmitting mechanism is also provided with a pushing plate 235 for urging the shaft 228 supporting the worm wheel 229 and pivot arm 224.

A reference numeral 236 represents a potentiometer which outputs the angle of rotation of the control motor 231. An angle detect value from the potentiometer 236 is feedback input to a control mechanism (not shown) to thereby obtain the angle of control rotation of the control motor 231 which is used to obtain the angle of displacement θ of the reflector 204 corresponding to the angle of rotation of a steering wheel of a motor vehicle. The potentiometer 236 is rotatably connected to the rotational force transmitting mechanism 223 through a gear 237. Preferably, a housing (not shown) may be provided at a rear portion of the reflector 204 to constitute a rear part of the headlamp.

The operation of the fourth embodiment will be described with reference to FIG. 12 which is used to describe the operation of the third embodiment of the present invention.

The reflector drive mechanism of a projection lamp constructed in the above-mentioned manner is arranged such that the second focal point F2 of the reflector 204 is substantially identical with the focal point F of the collimator lens 201 and the shade 209 is fixedly disposed at the position of the focal points F, F2. Therefore, if the bulb 207 is turned on, as shown in FIG. 12A, the light that has passed through the collimator lens 201 then becomes substantially a parallel light and illuminates a forward path R1 (or a path ahead). If the steering wheel of the automobile is swung along a winding road R2 (in FIG. 12B, a right swing is shown), then the control motor 231 is rotated through the control mechanism to thereby rotate the worm wheel 229. This displaces the reflector 204 in 2O the direction of the arrow B through the elongated guide groove 226 of the lower reflector mount 222, which is engaged with the guide pin 225 protruding from the end of the pivot arm 224, while it is supported by the guide engagement mechanism 205, thereby inclining the optical axis L2 of the reflector 204 with respect to the optical axis L1 of the collimator lens 201. Therefore, in a central range S1 of the upper and lower guide edges 212, 213, as shown in FIG. 12B, the light distribution pattern of the illuminating light is deflected only in a horizontal direction and, in two side ranges S2, as shown in FIG. 12C, the light distribution pattern P of the illuminating light is deflected in such a manner that it goes downwardly while drawing an arc-shaped locus as it is deflected horizontally and laterally, which can solve a problem of a dazzling light against an oncoming automobile.

Therefore, according to the optical axis deflecting and pivotally supporting means, if the reflector 204 is displaced in a right and left direction, then there is produced a difference in height between the upper pivotal support structures, whereby the reflector 204 is rotated with the lower pivotal support structure as a longitudinal pivot and with the optical axis L2 as an axis of rotation.

According to the optical axis deflecting and pivotally supporting means of the fourth embodiment, as described above, the guide engagement mechanism 205 includes the upper and lower guide edges 212 and 213 provided at the upper and lower portion of the through hole 211 formed on the guide plate 210 engages with the upper and lower guide rollers 214 and 215, respectively, which protrude toward the reflector 204, and the upper and lower guide rollers 214 and 215 freely slide along the upper and lower guide edges 212 and 213, respectively. However, the invention is not limited thereto or thereby. Another arrangement may be applicable in which, for example, a part of the upper guide roller 214 is arranged slidable while it is stopped at an engaging portion with the upper guide edge 212. Further, in the other arrangement, merely the upper guide roller 214 may be arranged slidable along the upper guide edge 212.

As has been described heretofore, according to the reflector drive mechanism of a projection lamp of the invention, due to the fact that the reflector of the projection lamp is swingably connected to the collimator lens by means of the optical axis deflecting and pivotally supporting means comprising the guide engagement mechanism and the reflector is driven or swung by a controllable actuator such as a control motor or the like to thereby change the angle of light entering the collimator lens so as to be able to freely deflect the illuminating pattern of the headlamp right and left as well as vertically, a bulb serving as a light source can be made relatively small. As a result of this, the present reflector drive mechanism can improve a thermal efficiency and solve the problem of lamp heat storage, that is, it can solve various problems caused by thermal stress.

Further, the present reflector drive mechanism is able to control the illuminating light very finely, for example, when the illuminating light is swung, the light can be controlled to go downwardly. That is, the invention not only can solve the problem of a dazzling light against an oncoming automobile but also is advantageous in that it can provide a very fine and favorable light distribution when driving on a winding road. Thus, the invention can provide a very great effect when it is actually enforced.

Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A reflector drive mechanism for use in a projection lamp including a reflector disposed at the rear of a collimator lens, a bulb as a light source for emitting light and a shade fixedly interposed between the collimator lens and bulb for obstructing some of said light, said reflector drive mechanism comprising:

means for pivotally mounting said reflector to said collimator lens and for deflecting an optical axis of said reflector with respect to an optical axis of said collimator lens; and a controllable actuator for causing said pivotally mounting means to deflect said reflector.

2. A reflector drive mechanism for use in a projection lamp as claimed in claim 1, wherein said pivotally mounting and deflecting means is a guide engagement mechanism in which guide pins respectively provided on the side of said reflector are pivotally in engagement with a plurality of guide grooves formed in a guide plate fixed on the side of said reflector in such a manner that said guide pins are free to slide along said grooves.

3. A variable light distribution type of headlamp of a projection lamp type including a front surface lens disposed on a forward optical axis of a reflector having an ellipsoidal reflecting mirror surface, a bulb fixedly disposed substantially at the position of a first focal point of the reflector for emitting light, and a shade interposed between the bulb and front surface lens for obstructing some of said light, wherein said shade is fixedly secured on the side of said collimator lens, said reflector operating integrally with said bulb is pivotally mounted swingably with respect to an optical axis, and said reflector is arranged such that it can be swung and deflected by a reflector displacement device disposed in a lamp body.

4. A variable light distribution type of headlamp as claimed in claim 3, wherein said front surface lens is a collimator lens.

5. A variable light distribution type of projection lamp wherein a frame-shaped guide member with the inside thereof cut out in a substantially rectangular shape is fixedly secured to a headlamp lens, a reflecting mirror is disposed to oppose an opening formed in said guide member and is slidable along said guide member, and in one of upper and lower portions of said reflecting mirror there is disposed a roller member and a spring for urging said roller member toward said reflecting mirror, said roller member being movable to enable said reflecting mirror to slide along said guide member.

* * * * *